US010493532B2

(12) United States Patent
Hart et al.

(10) Patent No.: US 10,493,532 B2
(45) Date of Patent: Dec. 3, 2019

(54) THERMAL EXPANSION FIT BUILD PLATE FOR ADDITIVE MANUFACTURING

(71) Applicant: General Electric Company, Schenectady, NY (US)

(72) Inventors: Kassy Moy Hart, Greenville, SC (US); Benjamin Paul Lacy, Greer, SC (US); Archie Lee Swanner, Jr., Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 318 days.

(21) Appl. No.: 15/407,526

(22) Filed: Jan. 17, 2017

(65) Prior Publication Data
US 2018/0200800 A1 Jul. 19, 2018

(51) Int. Cl.
| B22F 7/08 | (2006.01) |
| B22F 5/04 | (2006.01) |
| B22F 3/10 | (2006.01) |
| B33Y 30/00 | (2015.01) |
| B22F 3/105 | (2006.01) |
| B33Y 10/00 | (2015.01) |
| B33Y 50/02 | (2015.01) |
| B23K 101/00 | (2006.01) |

(52) U.S. Cl.
CPC .............. *B22F 7/08* (2013.01); *B22F 3/1055* (2013.01); *B22F 2003/1056* (2013.01); *B23K 2101/001* (2018.08); *B33Y 10/00* (2014.12); *B33Y 30/00* (2014.12); *B33Y 50/02* (2014.12)

(58) Field of Classification Search
CPC .. B22F 3/0155; B22F 5/04; B22F 7/08; B22F 2003/1056; F05D 2230/31; F05D 2230/51; F05D 2230/22; B33Y 30/00; B29C 64/245
See application file for complete search history.

(56) References Cited

U.S. PATENT DOCUMENTS

| 7,231,713 | B2 | 6/2007 | Boegli et al. |
| 2014/0165398 | A1 | 6/2014 | Giovannetti et al. |
| 2014/0172111 | A1 | 6/2014 | Lang et al. |
| 2014/0255194 | A1 | 9/2014 | Jones |
| 2015/0314403 | A1 | 11/2015 | Bruck et al. |
| 2015/0352676 | A1 | 12/2015 | Arjakine et al. |
| 2015/0360287 | A1 | 12/2015 | Zink et al. |
| 2017/0056975 | A1* | 3/2017 | Carter ................... B22F 3/1055 |
| 2017/0095887 | A1* | 4/2017 | Marchione ........... B23K 26/342 |
| 2017/0113303 | A1* | 4/2017 | Rockstroh ............ B22F 3/1055 |
| 2018/0236616 | A1* | 8/2018 | Garay .................... F01D 5/284 |
| 2019/0084044 | A1* | 3/2019 | Tanigawa ............... B23K 26/24 |

* cited by examiner

*Primary Examiner* — Robert B Davis
(74) *Attorney, Agent, or Firm* — Dale Davis; Hoffman Warnick LLC

(57) ABSTRACT

This disclosure provides systems, methods, and tooling for additive manufacturing on a build surface of a pre-existing component. An additive manufacturing tool successively positions layers of powdered materials and selectively fuses the layers of powdered materials to create an additive component on the build surface of the pre-existing component. The pre-existing component is secured in a build plate by a thermal expansion fit during the additive manufacturing process.

17 Claims, 6 Drawing Sheets

THERMAL EXPANSION FIT BUILD PLATE FOR ADDITIVE MANUFACTURING

BACKGROUND OF THE INVENTION

The disclosure relates to systems and tooling for positioning components during additive manufacturing and, more specifically, positioning pre-existing components for addition of an additive component.

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include airfoil components for installation in a turbomachine such as an aircraft engine or power generation system, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

Additive manufacturing can allow a component to be formed from a reserve of fine metal powder positioned on a build plate, which is processed by an electron beam or laser (using fusing heat treatments such as sintering or melting) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process.

Additive manufacturing opens opportunities for repair of existing components and/or creation of hybrid components where an additive component (or sub-component) is built on one or more surfaces of a pre-existing component without requiring separate attachment. For example, cast components may be used as a base component and additive features may be built on a cast and prepared build surface of the base component positioned in an additive manufacturing tool or modality. Base plates are generally designed for building new components and may not be compatible with positioning pre-existing components.

SUMMARY OF THE INVENTION

A first aspect of this disclosure provides a system with a thermal expansion fit base plate for additive manufacturing. An additive manufacturing tool successively positions layers of powdered materials and selectively fuses the layers of powdered materials to create an additive component. A build plate, upon which the layers of powdered materials are positioned and selectively fused to create the additive component, is positioned in the additive manufacturing tool. The build plate positions the additive component for successive build layers. A pre-existing component is secured in the build plate by a thermal expansion fit and has at least one build surface. The additive component is created on the at least one build surface of the pre-existing component.

A second aspect of the disclosure provides a method for additive manufacturing on a pre-existing component. A pre-existing component having at least one build surface is positioned in a build plate. The build plate is heated to create a thermal expansion fit to retain the pre-existing component in the build plate. An additive component is additively manufactured on the at least one build surface.

A third aspect of the disclosure provides a build plate for additive manufacturing. A build plate body defines a fixture mounting opening. A removable fixture is removably inserted into the fixture mounting opening of the build plate body. The removable fixture defines a component mounting opening for receiving a pre-existing component and retaining the pre-existing component by a thermal expansion fit. A build plate mount engages an additive manufacturing tool for positioning the build plate during creation of an additive component on at least one build surface of the pre-existing component retained in the removable fixture.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
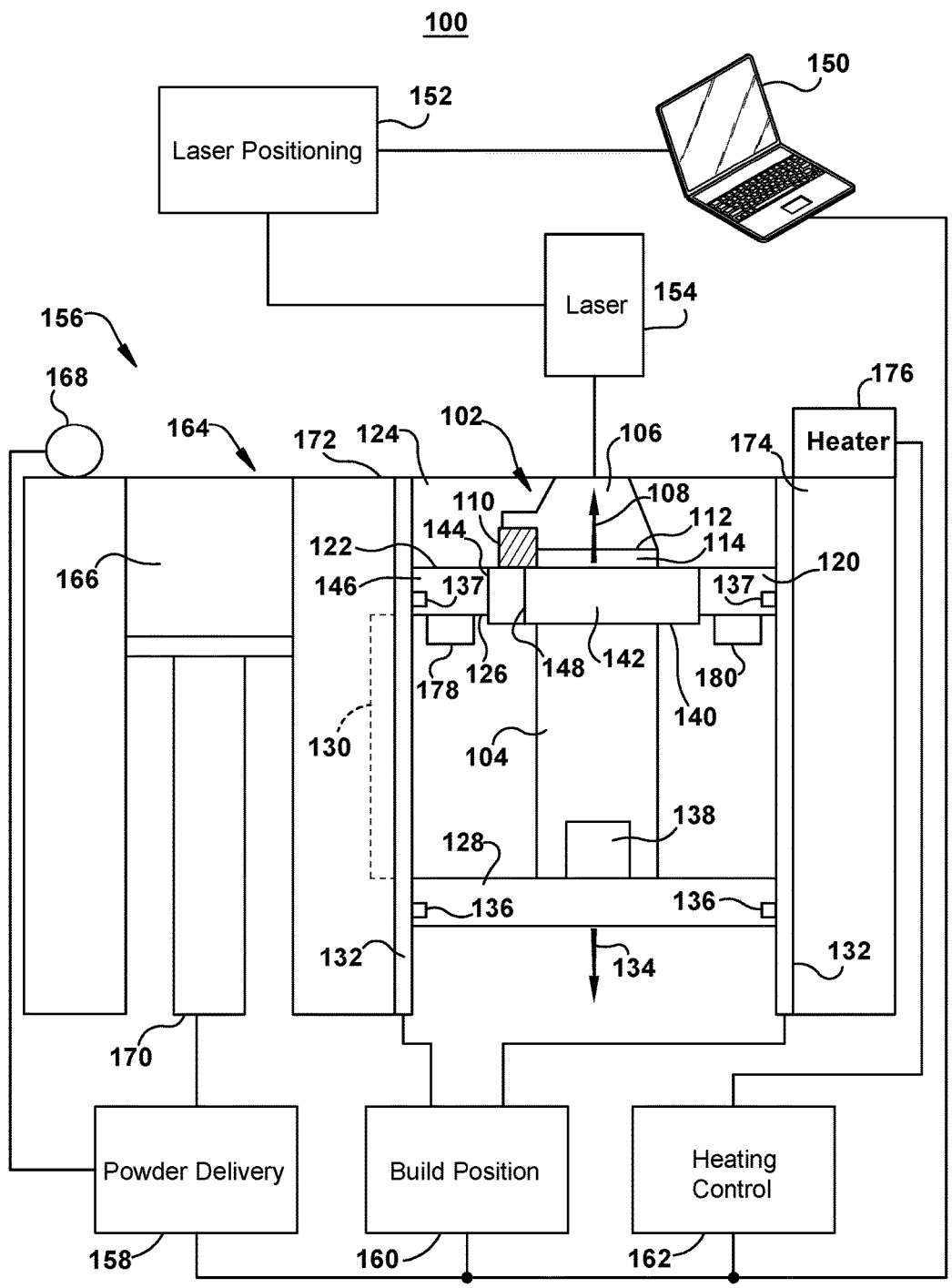
FIG. 1 shows a diagram of an example system for additive manufacturing according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, an example system 100 for additive manufacturing of a hybrid component 102, including a pre-existing component 104 and an additive component 106, is depicted. Component 102 may form part of, or may be adaptable to form part of, a larger component and/or machine, such as a power generation assembly. It will be understood, however, that component 102 may have applications other than those described by example herein. Component 102 may have a build direction 108 coincident with the Z axis describing the direction in which materials are added to form the desired structure. In additive manufacture, a "build direction" of one or more components may be defined by a fabricator before raw materials are processed from raw materials into a desired structure. A build direction for a given component and/or sub-component therefore defines the order in which structural features are formed over time as raw materials (e.g., metallic powders) are fused (sintered or melted) to form a structure. Such materials can include, e.g., one or more pure metals and/or alloys including without limitation: Copper (Cu), Chromium (Cr), Titanium (Ti), Nickel (Ni), aluminum (Al), etc. In an example embodiment, the build direction 108 of component 102 can be oriented along one axis, and perpendicular to the plane of X and Y axis, and generally can be defined to assist in describing the three dimensional structure of the component, as well as the way in which it is formed. Component 102 may include one or more supports 110 manufactured with component 102 to be removed prior to use, assembly, or further manufacturing of component 102.

In some embodiments, component 102 may by created by additively manufacturing additive component 106 on a component build surface 112 of pre-existing component 104. For example, pre-existing component 104 may be positioned in and through build plate 120. Build plate 120 may have a plate build surface 122 and a build portion 114 may protrude from plate build surface 122 into build chamber 124 to expose one or more build surfaces, such as component build surface 112. In some embodiments, pre-existing component 104 may have a component body 116 of sufficient size to extend through build plate 120. For example, component body 116 may extend through and away from a non-working surface 126 in a direction opposite build direction 108. In some embodiments, pre-existing component 104 may benefit from additional positioning support in addition to build plate 120. For example, component body 116 may be engage and be supported by a support plate 128. Support plate 128 and build plate 120 may be maintained with a fixed distance 130 between them to assist in maintaining the position of component 102 during additive manufacturing processes. In some embodiments, support plate 128 and build plate 120 are mounted to a common positioning elevator 132 for moving component 102 in a working direction 134 opposite build direction 108. For example, support plate 128 and build plate 120 may incorporate mounting features 136, 137 for removably engaging positioning system 132. Mounting features 136, 136 may include rails and complementary slots, tongue and groove, flanges, support members, and other mating features, with or without removable fasteners for attaching each of support plate 128 and build plate 120 to positioning elevator 132. Support plate 128 may include a base receptacle 138, such as a custom recess for receiving a distal portion of component body 116, with or without mechanical fasteners for securing component body 116 in base receptacle 138. In some embodiments, a base clamp is incorporated into base receptacle 138.

In some embodiments, build plate 120 may include a removable fixture 140 for positioning and securing pre-existing component 104 in build plate 120. Removable fixture 140 may include a fixture body 142 inserted into complementary fixture mounting opening 144 in build plate body 146. Pre-existing component 104 may be inserted through a component mounting opening in removable fixture 140. In some embodiments, removable fixture 140 may further include an expansion gap 148 for accommodating a thermal expansion fit between pre-existing component 104 and build plate 120.

Additive component 106 may be built from successive layers of powdered materials that are fused to one another and the preceding fused layers of additive component 106. The initial layer of additive component 106 may be built on component build surface 112, plate build surface 122, or a combination thereof. Additive component 106 may initially exist solely as a 3D model or other computer-based instructions for building additive component 106 and stored in a computing system 150. These instructions may be provided to additive manufacturing system 100 including a laser positioning system 152, laser 154, and build stage 156. Build stage 156 may include powder delivery system 158, build positioning system 160, and heating control system 162. In some embodiments, laser positioning system 152, powder delivery system 158, build positioning system 160, and heating control system 162 may be controlled by computing system 150. Successive layers of unfused powdered materials may be positioned by powder delivery system 158 and laser positioning system 152 may control laser 154 to selectively and controllably fuse the powdered material at desired positions, leaving the remaining powdered material in that layer unfused. In some embodiments, laser positioning system 152 may move laser 154 in a generally X-Y coordinate system and control the timing and duration of laser 154 for selectively sintering powdered materials corresponding to that slice of the desired component shape, as well as any necessary supports, such as supports 144. Build stage 156 may include a powder bed 164 with a top surface of powdered materials that provide the working layer for laser 154. In some embodiments, build stage 156 may include a powder hopper 166 for holding powdered materials prior to positioning or distribution across powder bed 164 and distributor 168 for positioning the powdered materials in an even layer in powder bed 164. In the example shown, powder hopper 166 may be a powder well with a delivery piston 170 for pushing a desired volume of powdered materials into powder bed 164 for building each layer of additive component 106. Distributor 168 may be a mechanical distributor, such as a roller, rake, brush, or sweep arm, that drags and levels powdered materials from powder hopper 166 across powder bed 164. In embodiments with a fixed powder bed, build positioning system 152 may include a recessed build chamber 124 with a moving build plate 120 that retracts from powder bed 164 as successive layers are added to component 102. Build plate 120 may be supported by positioning elevator 132 and move in a working direction 134 that is opposite build direction 108. Build plate 120 may provide a plate build surface 122 that supports a portion of additive component 106, where at least a portion of the first layer of additive component 106 or additive supports 144 may be fused in contact with plate build surface 122 and any portion of additive component 106 in contact with build plate 120 may be removed from build surface 122 when the build is complete. Build chamber 124 thereby gets deeper to accommodate the completed portion of component 102 as the build progresses. Build chamber 124 may be defined as the space between sidewalls 172, 174 from powder bed 164 to the maximum depth of build plate 120 in its deepest working position. Build chamber 124 may include additional sidewalls perpendicular to sidewalls 172, 174 and laterally enclosing build chamber 124. System 100 is described herein with regard to direct metal laser melting (DMLM) in a powder bed additive manufacturing system modality. It is understood that the general teachings of the disclosure are equally applicable to other modalities of additive manufacturing now existing or developed in the future.

In the embodiment shown, a number of heaters 176, 178, 180 may be incorporated into build stage 156. Heaters 176, 178, 180 may heat and maintain powder bed 164, build chamber 124, and build plate 120 at a desired pre-fusing temperature for the unfused powdered materials in build stage 156. For example, heater 176 may be a radiant, optical, or convection heater for heating unfused powdered materials on powder bed 164 to pre-condition unfused powdered materials on the working surface for laser 154. Heaters 178, 180 may be heating blocks or other conduction heating elements attached to build plate 120 for raising its temperature above ambient and assisting in maintaining the temperature of unfused powdered materials and/or controlling cooling rates in component 102.

In some embodiments, computing system 150 may provide a plurality of programmatic controls and user interface(s) for operating and coordinating laser positioning system 152, powder delivery system 158, build positioning system 160, and heating control system 162 before, during, and after the build process for additive component 106. In some embodiments, computing system 150 is a general purpose computing device, such as a personal computer, work station, mobile device, or an embedded system in an industrial control system (using general purpose computing components and operating systems). In some embodiments, computing system 150 may be a specialized data processing system for the task of controlling operation of system 100. Computing system 150 may include at least one memory, processor, and input/output (I/O) interface interconnected by a bus. Further, computing system 150 may include communication with external I/O device/resources and/or storage systems, including connected system, such as laser positioning system 152, powder delivery system 158, build positioning system 160, and heating control system 162, and network resources. In general, a processor executes computer program code, such as an additive manufacturing build control program, that is stored in memory and/or a storage system. While executing computer program code, the processor can read and/or write data to/from memory, storage systems, and I/O devices. The bus provides a communication link between each of the components within computing system 150. I/O devices may comprise any device that enables a user to interact with computing system 150 (e.g., keyboard, pointing device, display, etc.). Computing system 150 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc. In some embodiments, computing system 150 is a laptop computer in communication with laser positioning system 152, powder delivery system 158, build positioning system 160, and heating control system 162 via a wired (serial, USB, Ethernet, etc.) or wireless (802.11, Bluetooth, etc.) connection and running application software for system 100.

Figure 2:
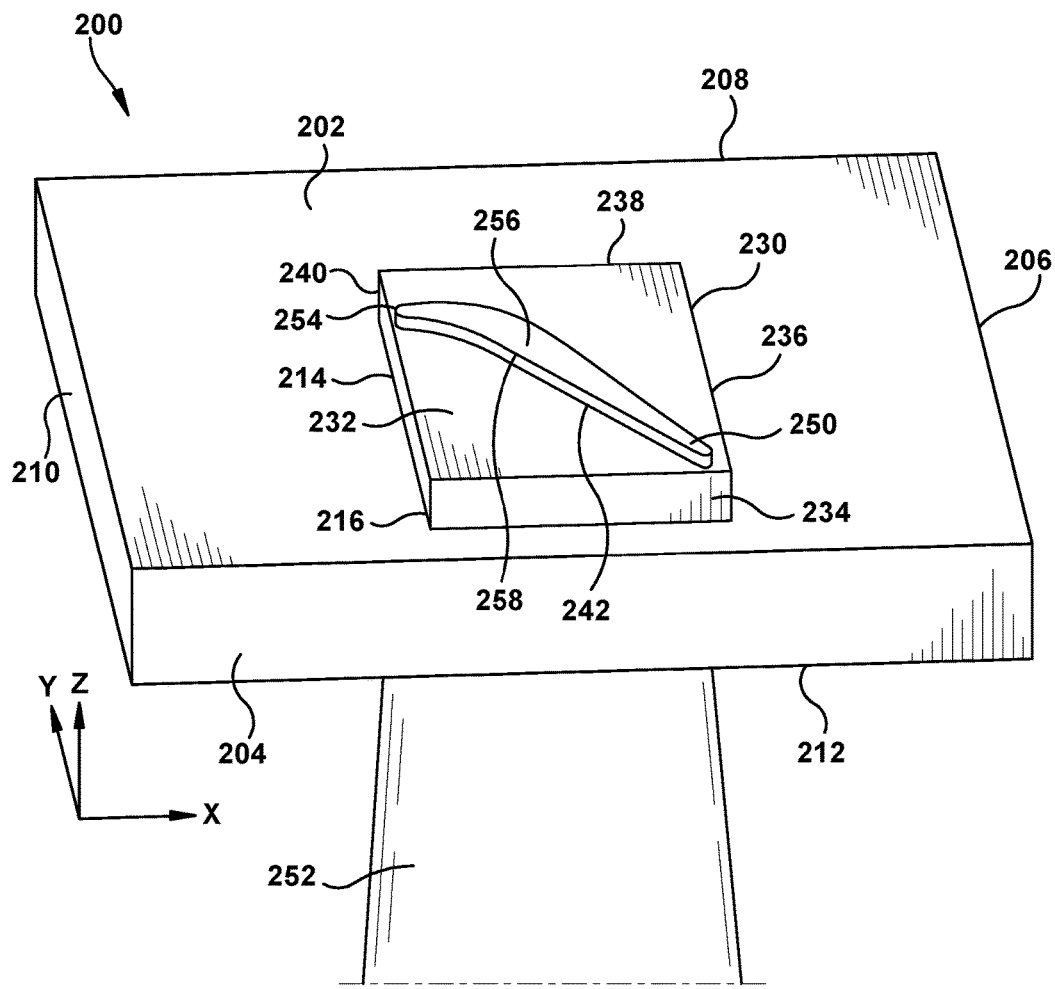
FIG. 2 shows a perspective view of an example build plate with removable fixture.

Referring to FIG. 2, an example build plate 200 with removable fixture 230 for positioning a pre-existing component 250 prior to placing build plate 200 into a build chamber of an additive manufacturing system, such as system 100 in FIG. 1. Build plate 200 has a build surface 202, a plurality of lateral surfaces 204, 206, 208, 210 and non-working surface 212. In some embodiments, one or more of lateral surfaces 204, 206, 208, 210 and/or non-working surface 212 may incorporate one or more mounting features (not shown) compatible with being removably connected to a positioning system in an additive manufacturing system. For example, build plate 200 may be inserted into the build chamber of an additive manufacturing system by engaging side rails or a carrier frame of an elevator (vertical positioning mechanism). The distance between build surface 202 and opposed non-working surface 212 may define a build plate thickness.

Build plate 200 may define a fixture mounting opening 214 for receiving, securing, and positioning removable fixture 230. In some embodiments, fixture mounting opening 214 is a through hole across the build plate thickness to accommodate pre-existing component 250 with at least one component dimension greater than the build plate thickness. For example, pre-existing component 250 may be an airfoil or similar component with an elongated body 252 in the Z direction relative to build surface 202. In the example shown, fixture mounting opening 214 is entirely surrounded by build surface 202. In other embodiments, fixture mounting opening 214 may be adjacent or interrupting one or more lateral surfaces 204, 206, 208, 210. In some embodiments, removable fixture 230 may be a custom mounting block for a particular pre-existing component design. Removable fixture 230 may have a fixture build surface 232, one or more lateral surfaces 234, 236, 238, 240 and non-working surface (obscured by build surface 202 of build plate 200). Removable fixture 230 may be removably disposed in fixture mounting opening 214. In some embodiments, removable fixture 230 has a cross-sectional shape, such as a rectangle, circle, other polygon, or more complex shape, and fixture mounting opening 214 has a substantially complementary cross-sectional shape with marginally larger dimensions such that removable fixture 230 may be inserted into fixture mounting opening 214. In some embodiments, lateral surfaces 234, 236, 238, 240 and fixture mounting opening 214 may define a fixture mounting gap 216. In some embodiments, fixture mounting gap 216 may be temperature dependent and removable fixture 230 may be made of a material with a different thermal expansion characteristics than at least the surrounding portion of build plate 200. For example, at a first, colder temperature, removable fixture 230 may have a more compact structure and resulting smaller external dimensions, leaving fixture mounting gap 216 of a tenth of an inch or more and enabling mounting fixture to easily be inserted into fixture mounting opening 214. At a second, warmer temperature, the materials of removable fixture 230 expand and increase the external dimensions to substantially eliminate fixture mounting gap 216 and create an interference fit under thermal expansion pressure or a thermal expansion fit. It will be understood that the materials of the surrounding portion of build plate 200 may also be expanding over the same temperature range, but that any expansion of fixture mounting opening 214 is less than the expansion of removable fixture 230 such that fixture mounting gap 216 is closed at a certain temperature. In some embodiments, fixture mounting gap 216 may be tapered in the Z direction such that it is larger near build surface 202 and may become an interference fit adjacent non-working surface 212, even at the first temperature. For example, the taper may be achieved by tapering either or both of the fixture mounting opening 214 or the lateral dimensions of mounting fixture 230. In the example shown, lateral surfaces 234, 236, 238, 240 may be partially exposed above build surface 202 such that fixture build surface 232 protrudes from build surface 202. For example, build surface 202 and fixture build surface 232 may be parallel surfaces, but not coplanar. In some embodiments and designs, building of an additive component may be limited to fixture build surface 232 (and any build surfaces of pre-existing component 250) and the nominal build surface 202 of build plate 200 may not be used for supporting the additive component.

Removable fixture 230 may define a component mounting opening 242 for receiving, securing, and positioning pre-existing component 250. In some embodiments, component mounting opening 242 is a through hole across the removable fixture thickness to accommodate pre-existing component 250 with at least one component dimension greater than the removable fixture thickness. For example, pre-existing component 250 may be an airfoil or similar component with an elongated body 252 in the Z direction relative to fixture build surface 232. In the example shown, component mounting opening 242 is entirely surrounded by fixture build surface 232. In some embodiments, removable fixture 230 may be a custom mounting block for a particular pre-existing component design. For example, component mounting opening 242 may have a cross-sectional shape following the geometry of pre-existing component 250 along a mounting portion of pre-existing component 250 that is engaged by removable fixture 230. Component mounting opening 242 may have a substantially complementary cross-sectional shape with marginally larger dimensions such that pre-existing component 250 may be removably disposed in component mounting opening 242. In some embodiments, removable fixture 230 may be made in two or more parts such that it can separate along component mounting opening 242 to release pre-existing component 250 after the build. For example, complementary and interlocking portions of removable fixture 230 may be held in place around pre-existing component 250 by a hinge and fastener, interlocking surfaces, and/or insertion in fixture mounting opening 214. A working portion 254 of pre-existing component 250 may be exposed in the Z direction from fixture build surface 232. For example, one or more working surfaces, such as distal surface 256 and lateral surface 258, may be positioned and exposed from build surface 232 for the addition of an additive component.

Figure 3:
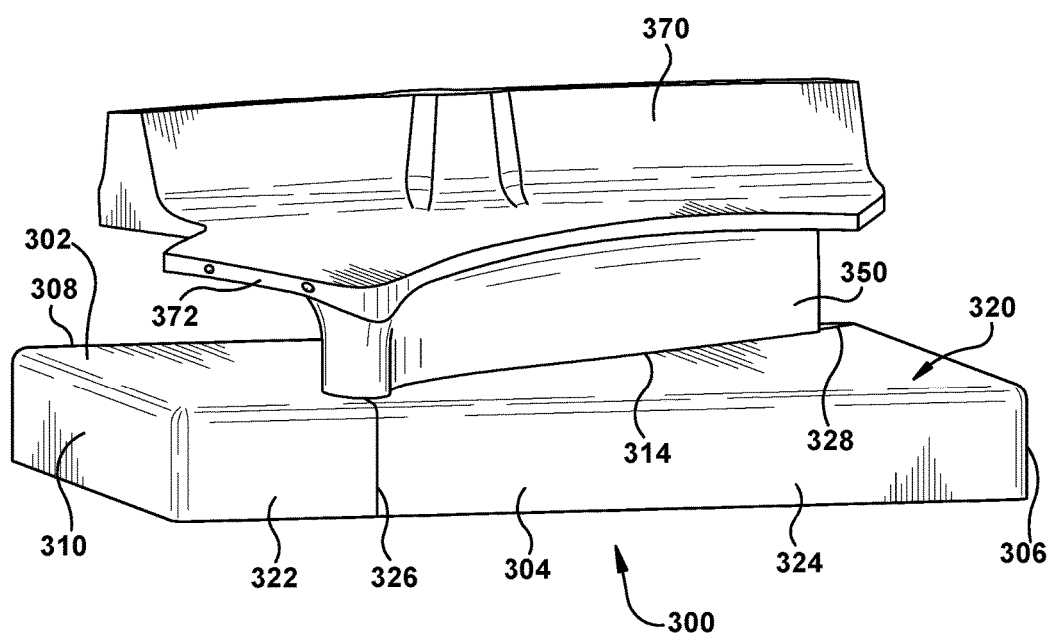
FIG. 3 shows a perspective view of an example removable fixture.

Referring to FIG. 3, an example two-part removable fixture 300 is shown with a working portion of a pre-existing component 350 and an additive component 370 built upon pre-existing component. Note that in the example shown, overhanging feature 372 of additive component 370 may have required additively manufactured supports during the build process, but those supports have been excluded for the purposes of this figure, such as after removal of supports post-build. Removable fixture 300 may have a fixture build surface 302, one or more lateral surfaces 304, 306, 308, 310 and non-working surface 312. In some embodiments, additive component 370 may include one or more structures, potentially including supports, built on fixture build surface 302 in addition the any build surfaces of pre-existing component 350. Removable fixture 300 may define a component mounting opening 314 for receiving, securing, and positioning pre-existing component 350 within removable fixture 300 and, therefore, within a build plate into which removable fixture 300 is installed. In some embodiments, removable fixture 300 includes a fixture body 320 divided into a first body section 322 and second body section 324. First body section 322 and second body section 324 may divide fixture body 320 along component mounting opening 314 and one or more separable seams 326, 328. Each of separable seams 326, 328 may extend from component mounting opening 314 to an exterior edge, such as lateral surfaces 304, 306, 308, 310. Separable seams 326, 328 may be defined by complementary and interlocking surfaces on each of first body section 322 and second body section 324. In some embodiments, separable seams 326, 328 may each define a gap when removable fixture 300 is initially positioned around pre-existing component 350. In some embodiments, removable fixture 300 may be made of a material selected for thermal expansion characteristics such that as it is heated, it expands to create a thermal expansion fit that closes one or more gaps at separable seams 326, 328 or along component mounting opening 314 and pre-existing component 350. In some embodiments, first body section 322, second body section 324, and an engaged portion of pre-existing component 350 may define a complete and interlocking cross-section and rely solely on an interference fit with a compatible build plate to initially hold each in place until thermal expansion locks them all in place. In some embodiments, first body section 322 and second body section 324 may be held in place around pre-existing component 350 by a hinge and fastener, interlocking surfaces (jigsaw, tongue/groove, pin/hole, flange/slot, etc.), and/or insertion in fixture mounting opening 314.

Figure 4:
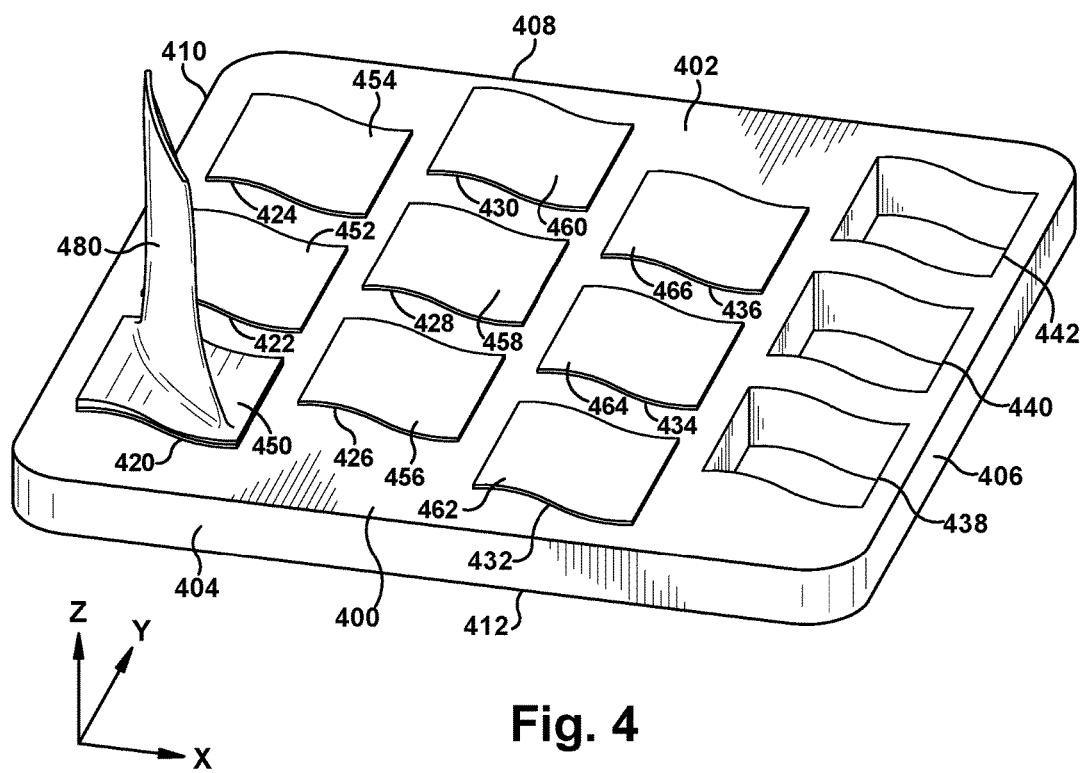
FIG. 4 shows a perspective view of another example build plate.

Referring to FIG. 4, an example build plate 400 shows multiple pre-existing components 450, 452, 454, 456, 458, 460, 462, 464. 466, one of which is shown with an additive component 480. Build plate 400 has a build surface 402, a plurality of lateral surfaces 404, 406, 408, 410 and non-working surface 412. In some embodiments, one or more of lateral surfaces 404, 406, 408, 410 and/or non-working surface 412 may incorporate one or more mounting features (not shown) compatible with being removably connected to a positioning system in an additive manufacturing system. For example, build plate 400 may be inserted into the build chamber of an additive manufacturing system by engaging side rails or a carrier frame of an elevator (vertical positioning mechanism). Build plate 400 may define a plurality of component mounting openings 420, 422, 424, 426, 428, 430, 432, 434, 436, 438, 440, 442 for receiving, retaining, and positioning pre-existing components 450, 452, 454, 456, 458, 460, 462, 464, 466 for additive building. Component mounting openings 438, 440, 442 are shown without pre-existing components in position. In some embodiments, each of component mounting openings 420, 422, 424, 426, 428, 430, 432, 434. 436, 438, 440, 442 may be a custom receptacles for a particular pre-existing component design. For example, component mounting openings 420, 422, 424, 426, 428, 430, 432, 434, 436, 438, 440, 442 may have a cross-sectional shape following the geometry of pre-existing components 450, 452, 454, 456, 458, 460, 462, 464, 466, along a mounting portion of each. Component mounting openings 420, 422, 424, 426, 428, 430, 432, 434, 436, 438, 440, 442 may have a substantially complementary cross-sectional shape with marginally larger dimensions such that pre-existing component 450, 452, 454, 456, 458, 460, 462, 464, 466, 468, 470, 472 may be removably disposed therein. Note that additive component 480 on pre-existing component 450 is shown for illustrative purposes only and that comparable components would be built on each of pre-existing components 452, 454, 456, 458, 460, 462, 464, 466, 468, 470, 472. In some embodiments, each of pre-existing components 450, 452, 454, 456, 458, 460, 462, 464. 466, 468, 470, 472 may be a cast and/or machined component base for the addition of additive components. In some embodiments, once pre-existing components 450, 452, 454, 456, 458, 460, 462, 464, 466, 468, 470, 472 are positioned in build plate 400, build plate 400 is heated and the expansion of build plate 400 creates a thermal expansion fit with pre-existing components 450, 452, 454, 456, 458, 460, 462, 464, 466, 468, 470, 472. In some embodiments, the resulting components may be compressor blades with dovetails or other components build on machined and/or cast base component.

Figure 5:
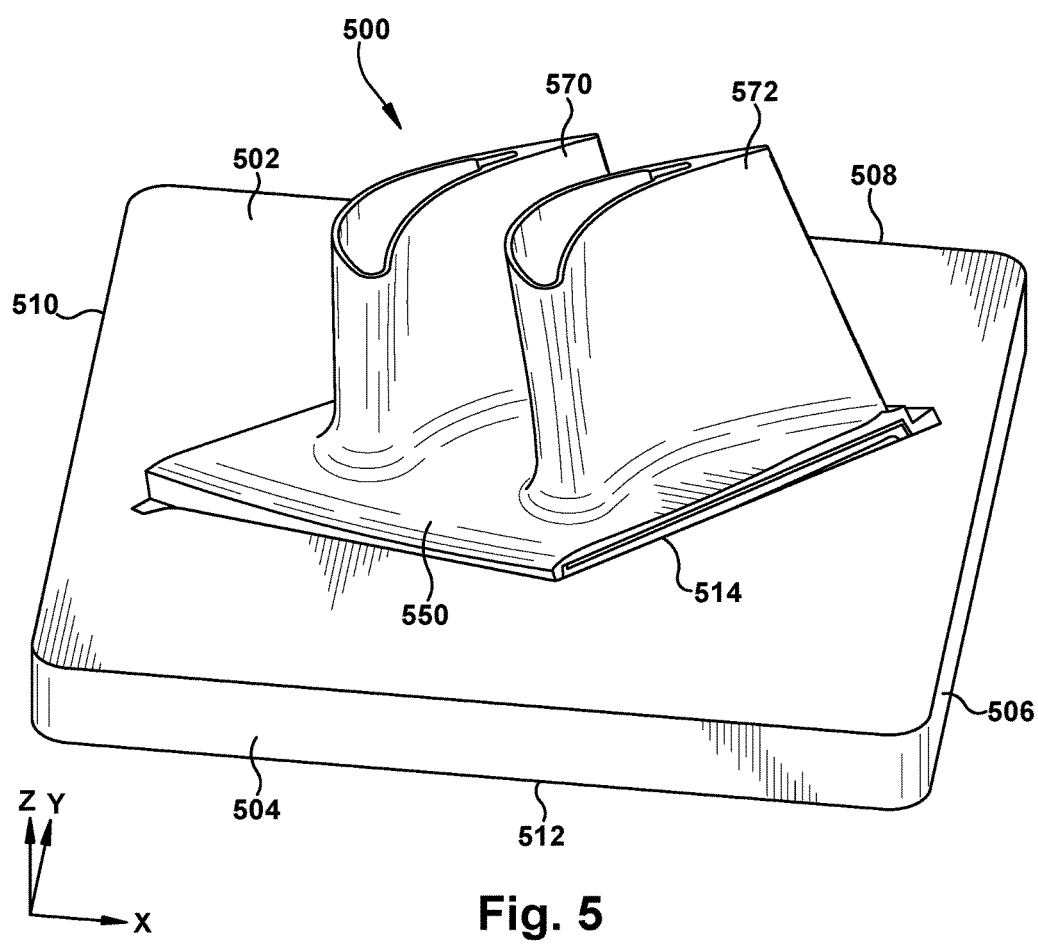
FIG. 5 shows a perspective view of another example removable fixture.

Referring to FIG. 5, an example removable fixture 500 is shown with a working portion of a pre-existing component 550 and two additive components 570, 572 built upon pre-existing component 550. Removable fixture 500 may have a fixture build surface 502, one or more lateral surfaces 504, 506, 508, 510 and non-working surface 512. Removable fixture 500 may define a component mounting opening 514 for receiving, securing, and positioning pre-existing component 550 within removable fixture 500 and, therefore, within a build plate into which removable fixture 500 is installed. In some embodiments, removable fixture 500 may be a custom mounting block for a particular pre-existing component design. For example, component mounting opening 514 may have a cross-sectional shape following the geometry of pre-existing component 550 along a mounting portion of pre-existing component 550 that is engaged by removable fixture 500. Component mounting opening 514 may have a substantially complementary cross-sectional shape with marginally larger dimensions such that pre-existing component 550 may be removably disposed in component mounting opening 514. Component mounting opening 514 and pre-existing component 550 may define one or more gaps between them, with or without one or more portions of interference fit at an installation temperature. In some embodiments, removable fixture 500 may be made of a material selected for thermal expansion characteristics such that as it is heated, it expands to create a thermal expansion fit that closes one or more gaps along component mounting opening 514 and pre-existing component 550. In some embodiments, the resulting components may be airfoil nozzles or other components where multiple complex additive structures may be added to a single base component.

Figure 6:
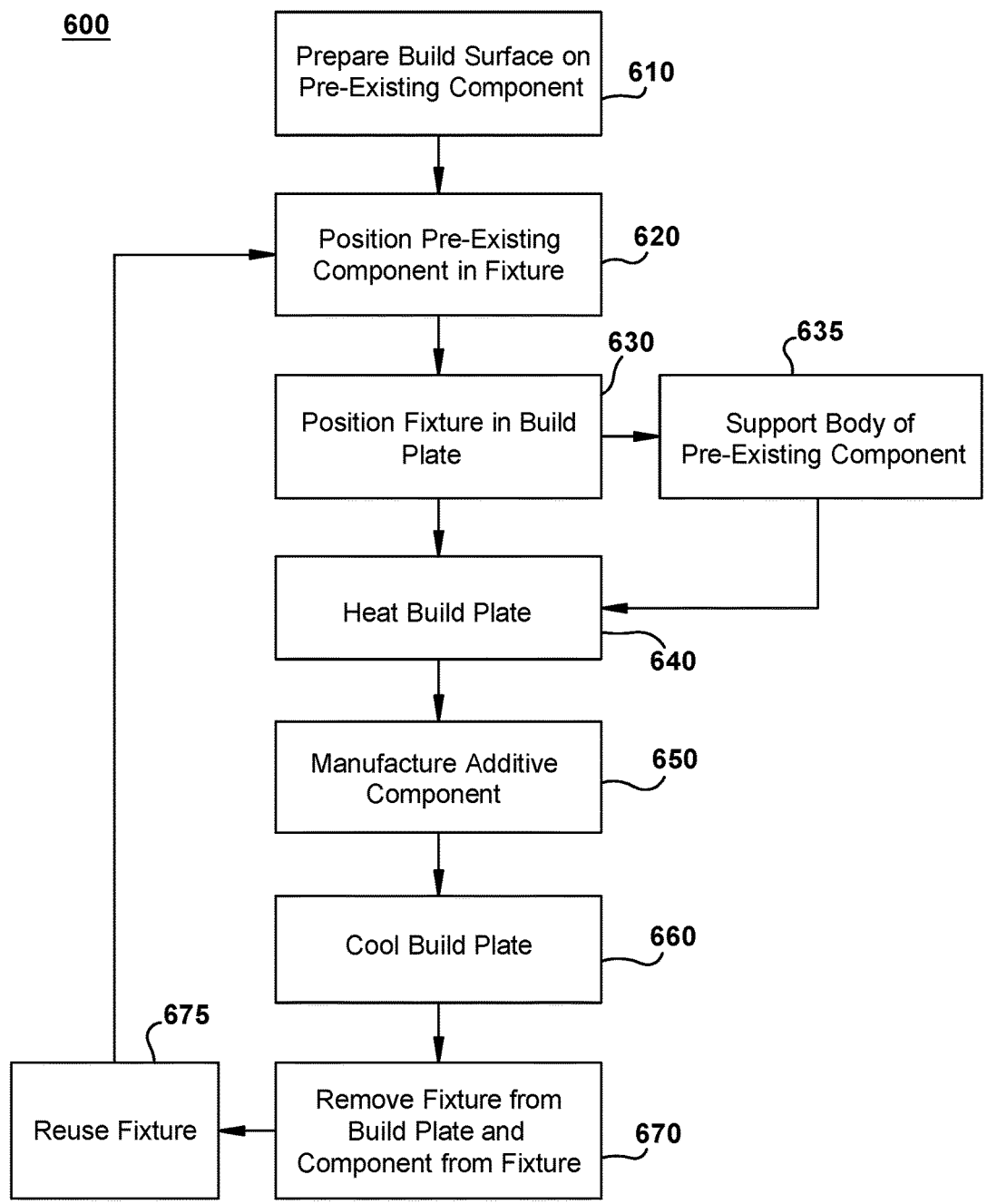
FIG. 6 shows an example method according to various embodiments of the disclosure.

Referring to FIG. 6, an illustrative method 600 of creating an additive component on an existing component is described. In step 610, one or more surfaces of a pre-existing component may be prepared to receive one or more structures or features as an additive component. For example, one or more surfaces that will be exposed above a build plate for fusing with the additive component may by treated mechanically, chemically, or thermally to better fuse with the additive materials. In step 620, the pre-existing component may be positioned within a removable fixture compatible with the desired additive manufacturing system. For example, the removable fixture may be a split fixture with a component mounting opening matching the exterior shape of the pre-existing component along a portion where the fixture engages the component. In step 630, the removable fixture may be positioned in the build plate for the additive manufacturing system. For example, the build plate may have a fixture mounting opening into which the fixture is inserted before or while the build plate is positioned in the additive manufacturing system. If the pre-existing component is large, oddly shaped, or otherwise extends below the build plate, a secondary support may be used. In step 635, the body of the pre-existing component may be received in a support. For example, the secondary support may include a receptacle for a base portion of the pre-existing component that holds the base portion in a fixed relative position to the build plate as the build plate moves during operations of the additive manufacturing system. In step 640, the build plate may be heated. For example, the additive manufacturing system may precondition (pre-heat) various components and materials, including the build plate, build chamber, powder bed, etc. in order to assist the additive manufacturing process, which heats the removable fixture and causes it to expand, creating a thermal expansion fit among the pre-existing component, removable fixture, and build plate. In step 650, an additive component may be manufactured on one or more build surfaces of the pre-existing component and one or more portions of adjacent build surfaces on the removable fixture and/or build plate. For example, a complex additive component, with or without supports, may be built on a pre-existing component that was cast and/or machined. In step 660, the build plate may be allowed to cool such that the removable fixture cools, shrinks, and releases the thermal expansion fit. For example, the build plate may be allowed to return to ambient temperature or proactively cooled to release the removable fixture. In step 670, the removable fixture may by removed from the build plate and the component, including both the pre-existing component and additive component build on it, may be removed from the removable fixture. For example, the removable fixture may be removed from the fixture mounting opening, allowing the fixture to split along the component mounting opening and release the component. In some embodiments, the removable fixture is reusable. In step 675, the reusable fixture is prepared for reuse and the method returns to step 620.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
an additive manufacturing tool configured to successively position layers of powdered materials and selectively fuses the layers of powdered materials to create an additive component;
a build plate upon which the layers of powdered materials are positioned and selectively fused to create the additive component, wherein the build plate positions the additive component for successive build layers; and
a pre-existing component secured in the build plate by a first thermal expansion fit and having at least one build surface, wherein the additive component is created on the at least one build surface of the pre-existing component, the pre-existing component has a component shape and the build plate defines a component mounting opening of a complementary shape for a retaining portion of the component shape defining a first expansion gap between the pre-existing component and the build plate at a first temperature, the first expansion gap is closed when at least one of the pre-existing component or the build plate is heated to a second temperature creating the first thermal expansion fit, the build plate includes a removable fixture defining the component mounting opening that is removably inserted into the build plate, the removable fixture has at least one exterior surface defining a fixture shape and the build plate defines a fixture mounting opening of a complementary shape for a portion of the fixture shape defining a second expansion gap between the removable fixture and the component mounting opening at the first temperature, and wherein the second expansion gap is closed when the build plate is heated to the second temperature creating a second thermal expansion fit.

2. The system of claim 1, wherein the removable fixture includes a first fixture section and a second fixture section and the first fixture section and the second fixture section each define at least one interlocking surface between the first fixture section and the second fixture section that extends from the component mounting opening to the at least one exterior surface defining a third expansion gap between the first fixture section and the second fixture section at the first temperature, wherein the third expansion gap is closed when the build plate is heated to the second temperature creating a third thermal expansion fit.

3. The system of claim 1, wherein the build plate has a first surface for receiving powdered materials and a second surface opposed to the first surface and the component mounting opening is a through hole between the first surface and the second surface, and wherein the at least one build surface of the pre-existing component extends past the first surface in a build direction and a body of the pre-existing component extends past the second surface in an opposite direction from the build direction.

4. The system of claim 3, further comprising a body support that supports the body of the pre-existing component and maintains a fixed relative position with the build plate during creation of the additive component.

5. The system of claim 1, further comprising a plurality of pre-existing components secured in the build plate by a respective thermal expansion fit, each of the plurality of pre-existing components having at least one build surface, wherein at least one additive component is created on the at least one build surface of each of the plurality of pre-existing components.

6. The system of claim 1, wherein the pre-existing component and the additive component form a unitary component selected from blades with tip shrouds, compressor blades with dovetails, or nozzle airfoils.

7. The system of claim 1, wherein the pre-existing component is selected from a machined component, a cast component, or a component blank for machining.

8. A method comprising:
positioning in a build plate a pre-existing component having at least one build surface wherein the pre-existing component has a component shape;
positioning the pre-existing component in a removable fixture that defines a component mounting opening of a complementary shape for a retaining portion of the component shape and defines a first expansion gap between the pre-existing component and the removable fixture at a first temperature;
inserting the removable fixture into the build plate as a removable portion of the build plate;
heating the build plate to create a first thermal expansion fit to retain the pre-existing component in the build plate, wherein heating the build plate to a second temperature closes the first expansion gap to create the first thermal expansion fit; and
additively manufacturing an additive component on the at least one build surface.

9. The method of claim 8, wherein additively manufacturing the additive component comprises successively positioning the additive component, successively positioning layers of powdered materials, and selectively fusing the layers of powdered materials to create the additive component in successive layers.

10. The method of claim 8, wherein the pre-existing component has a component shape and the build plate defines a component mounting opening of a complementary shape for a retaining portion of the component shape defining a first expansion gap between the pre-existing component and the build plate at a first temperature, wherein heating the build plate to a second temperature closes the first expansion gap to create the first thermal expansion fit.

11. The method of claim 10, wherein the build plate has a first surface for receiving powdered materials and a second surface opposed to the first surface and the component mounting opening is a through hole between the first surface and the second surface, and wherein positioning in the build plate includes putting the pre-existing component through the through hole such that the at least one build surface of the pre-existing component extends past the first surface in a build direction and a body of the pre-existing component extends past the second surface in an opposite direction from the build direction.

12. The method of claim 11, further comprising securing the body of the pre-existing component in a body support that supports the body of the pre-existing component and maintains a fixed relative position with the build plate during additively manufacturing the additive component.

13. The method of claim 8, wherein the removable fixture has at least one exterior surface defining a fixture shape and the build plate defines a fixture mounting opening of a complementary shape for an engagement portion of the fixture shape that defines a second expansion gap between the removable fixture and the component mounting opening at the first temperature, wherein heating the build plate to the second temperature closes the second expansion gap creating a second thermal expansion fit.

14. The method of claim 13, wherein the removable fixture includes a first fixture section and a second fixture section and the first fixture section and the second fixture section each define at least one interlocking surface between the first fixture section and the second fixture section that extends from the component mounting opening to the at least one exterior surface to define a third expansion gap between the first fixture section and the second fixture section at the first temperature, wherein heating the build plate to the second temperature closes the third expansion gap creating a third thermal expansion fit.

15. The method of claim 8, further comprising:
cooling the build plate to the first temperature;
removing the removable fixture from the build plate;
removing a unitary component including the pre-existing component and the additive component from the removable fixture; and
reusing the removable fixture for a next pre-existing component.

16. The method of claim 8, further comprising positioning a plurality of pre-existing components in the build plate, wherein heating the build plate creates thermal expansion fits to retain each of the plurality of pre-existing component in the build plate, and wherein each of the plurality of pre-existing components have at least one build surface, and further comprising additively manufacturing at least one additive component on the at least one build surface of each of the plurality of pre-existing components.

17. A build plate comprising:
a build plate body defining a fixture mounting opening;
a removable fixture removably inserted into the fixture mounting opening of the build plate body, the removable fixture defining a component mounting opening for receiving a pre-existing component and retaining the pre-existing component by a thermal expansion fit; and
a build plate mount that engages an additive manufacturing tool for positioning the build plate during creation of an additive component on at least one build surface of the pre-existing component retained in the removable fixture.

* * * * *